United States Patent
Morrow et al.

(10) Patent No.: US 7,927,554 B2
(45) Date of Patent: Apr. 19, 2011

(54) AIR PURIFIER

(75) Inventors: William H. Morrow, Barrie (CA); Larry James McLean, Barrie (CA)

(73) Assignee: L2B Environmental Systems, Inc., Barrie, Ontario (CA)

( * ) Notice: Subject to any disclaimer, the term of this patent is extended or adjusted under 35 U.S.C. 154(b) by 905 days.

(21) Appl. No.: 11/809,740

(22) Filed: Jun. 1, 2007

(65) Prior Publication Data

US 2007/0243114 A1 Oct. 18, 2007

Related U.S. Application Data

(63) Continuation of application No. 09/961,632, filed on Sep. 24, 2001, now Pat. No. 7,288,232.

(51) Int. Cl.
*B01J 19/08* (2006.01)

(52) U.S. Cl. ............... 422/186.3; 422/186.04; 422/121

(58) Field of Classification Search ............... 422/186.3, 422/121, 186.04
See application file for complete search history.

(56) References Cited

U.S. PATENT DOCUMENTS

| | | | |
|---|---|---|---|
| 3,957,675 A | 5/1976 | Schutt | |
| 5,246,687 A | 9/1993 | Gorre et al. | |
| 5,656,242 A | 8/1997 | Morrow et al. | |
| 5,991,080 A | 11/1999 | Kohta et al. | |
| 6,013,372 A * | 1/2000 | Hayakawa et al. | 428/411.1 |
| 6,083,871 A | 7/2000 | Fromson et al. | |
| 6,154,311 A | 11/2000 | Simmons et al. | |
| 6,228,480 B1 | 5/2001 | Kimura et al. | |
| 6,235,351 B1 | 5/2001 | DiMarzio et al. | |
| 6,238,630 B1 * | 5/2001 | Iimura | 422/186.3 |
| 6,238,631 B1 * | 5/2001 | Ogata et al. | 422/186.3 |
| 6,589,489 B2 | 7/2003 | Morrow et al. | |

FOREIGN PATENT DOCUMENTS

| | | | |
|---|---|---|---|
| JP | 09-180526 A | | 11/1997 |
| JP | 11-271511 A | | 10/1999 |
| JP | 2000-011719 A | * | 1/2000 |
| JP | 2000-676620 A | | 3/2000 |
| JP | 2000-118326 | | 4/2000 |
| JP | 2000-246115 A | | 9/2000 |

OTHER PUBLICATIONS

Fujishima, A., "TiO2 Photocatalysis: New Concepts and Environmental Applications" presented at the 8th International Fischer Symposium on Electrochemically and Environment, Jun. 18, 2000, Universitat Karlsruhe (TII), Germany, 4 pages.
Fujishima, A., "TiO2 Photocatlysis Fundamental and Applications", BKC, Inc., May 1999.

* cited by examiner

*Primary Examiner* — Kishor Mayekar
(74) *Attorney, Agent, or Firm* — Woodard, Emhardt, Moriarty, McNett & Henry LLP

(57) ABSTRACT

An air purifier has an air flow cavity bounded by cavity walls and a source of ultraviolet light emitting ultraviolet light within the cavity. The cavity walls have an ultraviolet light reflective coating. A plurality of photocatalytic particles are associated with the reflective coating. The photocatalytic particles are of a type which leads to production of oxygen and hydroxyl free radicals when illuminated with ultraviolet light in the presence of water.

38 Claims, 5 Drawing Sheets

AIR PURIFIER

CROSS-REFERENCE TO RELATED APPLICATIONS

This application is a continuation of U.S. application Ser. No. 09/961,632 filed Sep. 24, 2001, now U.S. Pat. No. 7,288,232, the contents of which are incorporated herein by reference.

BACKGROUND OF THE INVENTION

This invention relates to an air purifier and to a method of air purification.

It is known that ultraviolet ("UV") light sterilizes DNA so that biological material (such as viruses, bacteria, molds, yeasts, and pollens) exposed to UV light either dies or cannot reproduce. This property of UV light has been utilized to sterilize air in a building by simply placing UV lamps in the building's air ducts. One drawback with this approach is that biological material may not be exposed to UV light for a sufficient time to be sterilized. To address this drawback, it is known to utilize a porous air filter and mount a UV light for reciprocating movement across a face of the filter. In operation, a fan draws air through the filter resulting in biological material becoming trapped in the filter. The irradiation of the filter with the reciprocating UV light acts to kill this trapped biological material. However some biological material, namely viruses, readily pass through porous filters and would not, therefore, be sterilized with the combination of a porous filter in conjunction with a UV lamp. Furthermore, UV light degrades a porous filter requiring frequent replacement of same.

In our U.S. Pat. No. 5,656,242 issued Aug. 12, 1997, we describe several air purifiers which sterilise air with UV radiation. In one embodiment air is drawn through a filter and a perforated metal plate into a primary radiation cavity containing UV light. The filter traps biological material which is exposed to a low UV dose via the perforations in the metal plate. In another embodiment, air is drawn along a U-shaped path defined by a filter transmissive to UV2 and blocking UV1. UV1 and UV2 radiation generated by a lamp in the first leg of the U-shaped path forms sterilising ozone ($O_3$) in this leg; the UV2 which passes through the filter into the second leg of the U-shaped path breaks down this ozone. Water misters in this second leg result in the disassociated ozone forming hydroxyl radicals (OH) which further sterilise the air. Thus, the air is sterilised directly by the UV radiation and also indirectly by the UV radiation creating ozone and hydroxyl radicals. While this embodiment results in an effective purifier, water misters may not be readily available and increase maintenance needs of a system.

Therefore, there remains a need for an effective air purifier.

SUMMARY OF INVENTION

An air purifier has an air flow cavity bounded by cavity walls and a source of ultraviolet light emitting ultraviolet light within the cavity. The cavity walls have an ultraviolet light reflective coating. A plurality of photocatalytic particles are associated with the reflective coating. The photocatalytic particles are of a type which leads to production of oxygen and hydroxyl free radicals when illuminated with ultraviolet light in the presence of water.

In accordance with an aspect of this invention, there is provided an air purifier comprising an air flow cavity bounded by cavity walls; a source of ultraviolet light for emitting ultraviolet light such that ultraviolet light is present within said cavity; an ultraviolet light reflective coating and a plurality of photocatalytic particles covering a surface area of said cavity walls; said coating completely covering said surface area, said photocatalytic particles covering no more than 5.0% of said surface area so as to not materially affect UV reflectance of said coating; and said photocatalytic particles being of a type which leads to production of oxygen and hydroxyl free radicals when illuminated with ultraviolet light in the presence of water.

In accordance with another aspect of this invention, there is provided an air purifier comprising an air flow cavity bounded by cavity walls; a source of ultraviolet light for emitting ultraviolet light such that ultraviolet light is present within said cavity; an ultraviolet light reflective coating on said cavity walls; and a plurality of photocatalytic particles associated with said reflective coating, said photocatalytic particles of a type which leads to production of oxygen and hydroxyl free radicals when illuminated with ultraviolet light in the presence of water wherein said photocatalytic particles cover 0.01% to 5.0% of a surface area of said reflective coating so as to not materially affect UV reflectance.

Other features and advantages will become apparent from a review of the following description in conjunction with the drawings.

BRIEF DESCRIPTION OF THE DRAWINGS

In the figures which illustrate example embodiments of the invention.

DETAILED DESCRIPTION OF THE PREFERRED EMBODIMENTS

Figure 1:
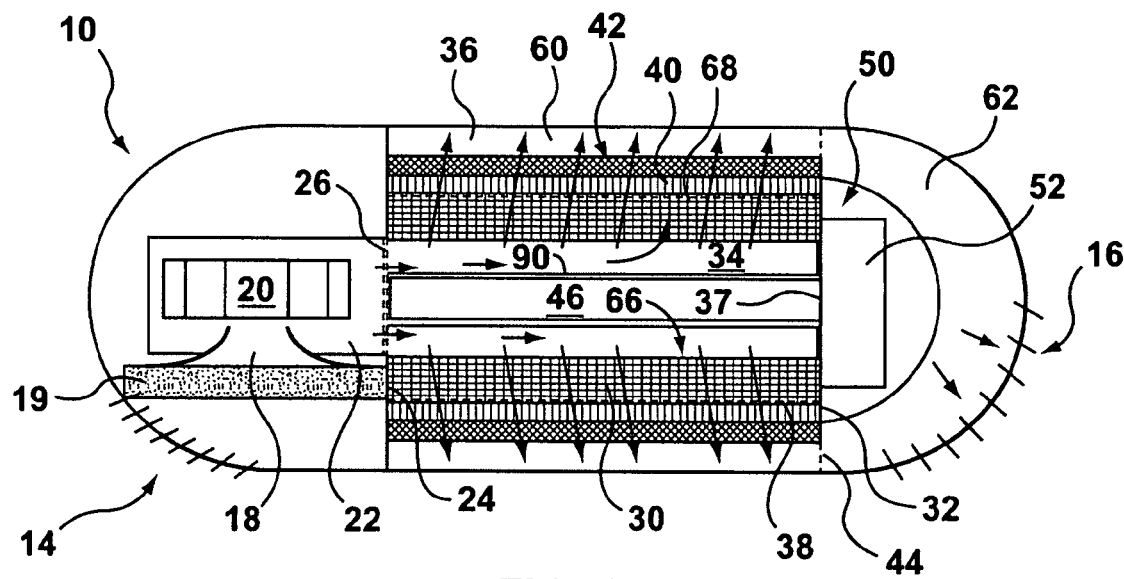
FIG. 1 is a schematic side view of an air purifier made in accordance with an embodiment of this invention.
Figure 2:
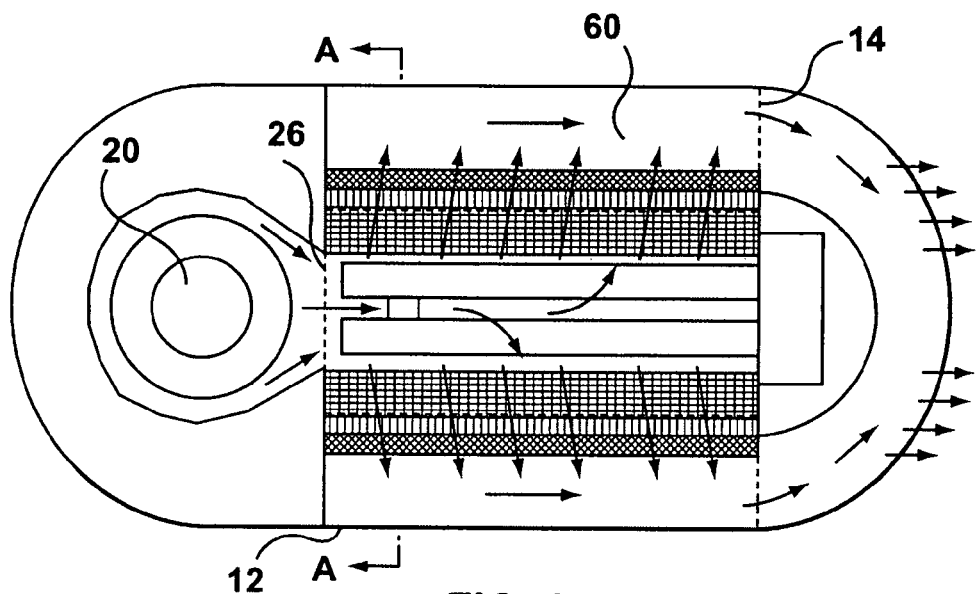
FIG. 2 is a schematic top view of the purifier of FIG. 1.
Figure 3:
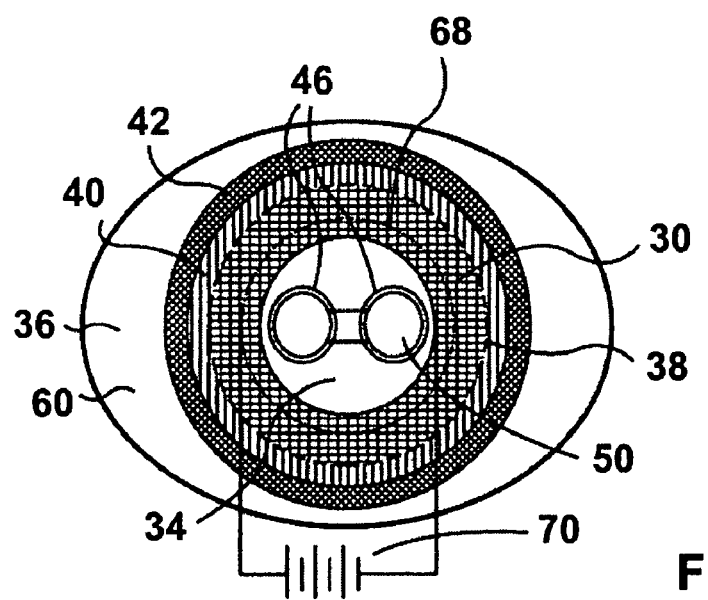
FIG. 3 is a schematic cross-sectional view along the lines 3-3 of FIG. 2.

Referencing FIGS. 1 to 3, an air purifier 10 has a housing 12 with an air intake 14 and an air exhaust 16. Within housing 12, an intake plenum 18 extends from the air intake 14, through a dust filter 19, to the suction inlet of a blower 20. An outlet plenum 22 extends between the outlet of the blower and an annular wall 24 inwardly depending from housing 12. Annular wall 24 has a concentric aperture covered with an ultra-violet ("UV") reflecting screen mesh 26 which allows the flow of air but which reflects UV. An annular dielectric body 30 extends between annular wall 24 and a second annular wall 32 inwardly depending from the housing to define a central cavity 34 and a peripheral annular cavity 36. Dielectric body 30 is enveloped by a screen mesh sleeve 38, a particulate filter 40, and a chemically absorbent filter 42. Sleeve 38 may, optionally, be provided with a UV coating on its inside surface such that it allows the transmission of air but reflects UV. The second annular wall 32 has a central opening 37 and a peripheral annular, UV reflecting, screen mesh section 44. The gas containing tube 46 of an ultraviolet lamp 50 extends through the opening 37 of wall 32 into cavity 34. The ballast 52 of lamp 50 is secured to wall 32.

Walls 24 and 32 along with the wall of the housing 12, define a UV chamber 60. The walls of this UV chamber many have a UV reflective coating. The outer cavity 36 opens into an exhaust plenum 62.

An inner member, shown as annular inner wire mesh 66, lines the inside wall of the dielectric body 30 and an outer member, shown as annular outer wire mesh 68 is embedded within the dielectric body 30. A voltage source 70 (FIG. 3) is connected (through a switch-not shown) between the inner mesh 66 and mesh sleeve 38, on the one hand, and outer wire mesh 68, on the other. Each mesh might be in the form of thin metal (Al with gold, rhodium or nickel coatings) radial blades which would reflect UV by grazing incidence but intercept significant amounts of light.

The intake and exhaust plenums 18 and 62 may be coated with a UV absorbing paint which, optionally, may be impregnated with a UV activated biocide such as $TiO_2$.

The UV lamp 50 may emit UV1, UV2 and UV3 radiation. UV1 radiation is defined as UV radiation below approximately 185 NM in wavelength, UV2 is defined as radiation between 185 and 300 NM in wavelength and UV3 is defined as UV radiation above 300 NM in wavelength.

UV1 radiation photo dissociates $O_2$ into ground state atomic oxygen (O) and water vapor into hydroxyl free radicals (OH) and hydrogen (H). UV2 radiation photo dissociates $O_3$ into $O_2$ and excited atomic oxygen (O*). These dissociation processes create powerful oxidants which can oxidize both bio-aerosols and volatile organic compounds rendering them either harmless, or converting them into species which are readily absorbed by filters. UV3 radiation does not photo dissociate any gaseous species but can excite photo catalysts, such as surfaces of $TiO_2$ and similar semiconductor catalysts.

All of these species will attach to surfaces in the annular dielectric 30 resulting in a concentration of the processes of oxidation. In this regard, when voltage source 70 is switched in, photo-electrically generated electrons from the inner wire mesh 66 and mesh sleeve 38 flow towards the oppositely charged outer mesh 68. These electrons attach to particulate and to the outer wire mesh 68. Such charge attachments retard the flow of the particulate enhancing the UV exposure by increasing the exposure time. In addition, electrostatic attachment of the particulate to the outer filters is enhanced increasing the efficiency of the filtration of the particulate.

The photoelectric effect is enhanced at shorter wavelengths for many materials. Thus using the inner wire mesh 66 as the cathode, which is near the lamp, would allow UV1 to be used to eject photo-electrons. An alternate method to using a mesh would be to coat a thin metal transparent conductive film directly on the lamp. Such cathodes (usually called semitransparent) are commonly used in optical sensing devices. This cathode should absorb only a tiny amount of UV1 exiting the lamp but could be highly photo-emissive by virtue of the enhanced quantum efficiency at shorter wavelengths. A very thin layer of gold, nickel, rhodium or other metal might be used. Cesium iodide or cesium telluride (in small quantity or low concentration) might also be used.

The inner mesh cathode 66 of the dielectric body may be coated with a UV reflective coating or may be constructed with a UV reflective material such as aluminum or aluminum coated with rhodium. This would concentrate the UV1 and UV2 in the central cavity 34 increasing the kill of bio-aerosols and photo-dissociative effects in the air. In addition, UV enhancement in the central chamber will not be at the expense of UV reaching the dielectric body if the reflective coating has a low absorbance. This occurs since the intensity of light inside the central cavity 34 will increase proportionately to the reflectance of the inner mesh cathode 66. Even though the cathode will transmit a smaller percentage of the light striking it, a larger amount of light will be available at its surface. Thus, a higher intensity of UV can be gained inside the central cavity 34 while preserving the flux into the annular dielectric body 30.

The UV reflective coating of the UV chamber 60, the inner mesh cathode 66, and the screen mesh sleeve 38 may be comprised of rhodium coated aluminum which can exhibit both high reflectance and a photoelectric effect. It may also be pure aluminum with a very thin protective film to protect it from oxidation but which will allow photoelectrons to escape. Such a film might be comprised of pure aluminum oxide, magnesium fluoride, or other fluoride material. The coating might also be comprised of an alkali metal with high UV reflectance in pure form and high photoelectric effect with a thin oxidation protective film such as a fluoride. The mesh size of the screen mesh sleeve 38 is chosen so that the preponderance of UV light reaching the sleeve is reflected. One way of achieving this is to keep the mesh size less than one tenth the size of the smallest wavelength to be reflected in a conductive mesh. In this fashion the mesh could serve as a particulate filter as well as a light reflector.

Unlike UV2 and UV3, UV1 radiation forms ozone which is a toxic gas. Consequently, it is desirable that most, or all, of the UV1 radiation be absorbed within central cavity 34 so as to reduce the prospect of ozone leaking from purifier 10.

The radial extent of the central cavity 34 of UV chamber 60 may therefore be dependent on the largest wavelength of UV1 produced by lamp 50. More particularly, in some embodiments of the invention, it may be desirable to have most of the UV1 at no greater than 170 NM. In such instance, even with the radial extent of the inner cavity being on the order of a few mm, most of the UV1 radiation will be absorbed by the air of the inner cavity 34. On the other hand, if the lamp produces UV1 at up to 185 NM, the radial extent of the inner cavity would need to be on the order of at least 10 cm for most of this radiation to be absorbed while traversing the inner cavity.

The dielectric body 30 is formed so as to be porous to air. Consequently, an air flow path is defined from purifier air intake 14, through the blower 20, into the central cavity 34 of the UV chamber 60, then through the annular dielectric body 30, the screen mesh sleeve 38, outer particulate filter 40, outer chemically absorbent filter 42, into the outer cavity 36 and out the air exhaust 16.

The dielectric body 30 is fabricated of a porous dielectric material which transmits UV radiation. Suitable materials could include:

- Silicon dioxide or pure silica in the form of fiber, sponge or frit;
- Silicon dioxide or pure silica in the form of an aerogel or xerogel;
- Silica gel granules;
- Silica gel granules coated onto silicon dioxide fibers or frit;
- Aluminum oxide (high purity) fibers, frit or granules;
- Aluminum oxide (high purity) coated aluminum fiber;
- Magnesium fluoride, calcium fluoride, barium fluoride, strontium fluoride or lithium fluoride powers, fibers, frits or coatings on transmitting or reflecting substrates;
- Quartz fiber, quartz fiber with silica gel coating; and
- Sapphire fiber.

Other dielectric matrices with air passageways may also be used. Two properties are, however, needed: that the dielectric body transmit UV (UV1, UV2 and UV3) and that ozone and water vapour attach to the dielectric body. The latter property increases the availability of these species for photo-catalytic reactions which convert UV light into hydroxyl free radicals.

Water vapour and ozone will attach (i.e., bond) to all dielectrics to at least some extent. However, in some dielectric materials this property is particularly pronounced. For example it is well known that silica gel can absorb up to 30% of its mass of water vapor and ozone. For any dielectric material, the ability to attach to ozone and water vapour will increase if the material is provided with a large surface area. This suggests that the porous dielectric body should have relatively small pores to increase surface area (limited only in that the pores should not be so small as to inhibit the admission of the molecules of water and ozone).

Optionally, the dielectric body is fabricated of a material which more strongly absorbs UV1 radiation than it does UV2 radiation. This may be desirable where the radial extent of the inner cavity is such that an appreciable portion of the UV1 radiation is not absorbed in the air of the central cavity 34. One suitable dielectric material with this property is quartz which, depending on the grade, will absorb more strongly at wavelengths below 185 nm than for wavelengths above 185 nm. Another material which may be suitable is aluminum oxide, provided it has sufficiently high purity to transmit UV.

The outer particulate filter 40 may be a pleated fabric filter or a fiber filter, which will trap biological contaminants such as viruses, bacteria and moulds. UV light that transmits through the screen mesh sleeve 38 will sterilize the biological material on the filter. The outer chemically absorbent filter 42 may be a charcoal or zeolite filter, both of which will trap gaseous chemical contaminants as well as biological material. The life of outer filter 42 will be enhanced if it is placed after (in the air flow sense) the particulate filter. This will insure that its absorbent material pores do not clog with micro particles. Filter 42 will serve to remove any residual organic breakdown fragments from the photochemical reactions that oxidize volatile organic compounds in the dielectric body 30 insuring the safety of the device.

Since UV2 and UV3 are expected to penetrate into the two outer filters 40, 42, photocatalytic materials such as $TiO_2$ may be added to either or both of these filters. This will produce a continuous cleaning effect, which may serve to cleanse the filters of organic particulate material, enhancing their lifetimes. The dielectric body 30 will also produce hydroxyl free radicals in the gas phase which will be entrained in the gas flow and which will also serve to continuously clean the filters of particulate. The dielectric body may also be coated with a photocatalytic material such as $TiO_2$ to enhance the destruction of volatile organic compounds.

Since UV3 will be readily transmitted through many materials, it is expected to make its way through the outer filter 42 and into the outer cavity 36. The outer wall of housing 12, which can also be coated with photo catalytic material, can then absorb UV3. Since the appropriate concentration of this material will act as a strong UV absorber, the outer wall will both absorb residual UV and add to the overall volatile organic compound removal by the device.

In operation, both the blower 20 and UV lamp 50 are activated and the switch to voltage source 70 is closed. The voltage then polarizes inner mesh 66, mesh sleeve 38, and outer mesh 68 establishing an electric field between the inner mesh and the mesh outer mesh and between the mesh sleeve and the outer mesh. Further, the UV radiation from lamp 50 results in photo-emission of electrons from the inner mesh 66 such that this mesh acts as a cathode. These electrons are attracted toward the outer mesh (which therefore acts as an anode) but attach themselves to the dielectric body 30 along the way. The body retains the static charge owing to its high electric impedance. (Note that a dielectric body 30 fabricated of quartz fibres is particularly advantageous in this regard due the high electrical resistance of quartz). This effect enhances the electric field established in the body 30. Blower 20 draws contaminated air from intake 14, though intake dust filter 19, and expels it into the central cavity 34 of UV chamber 60. The pressurized air in the inner cavity 34 moves downstream from the inner cavity 34 through dielectric body 30 to the outer filters 40 and 42. In doing so, much of the biological material (such as bacteria and viruses) in the air becomes trapped in the electric fields set up between meshes 38, 66, and 68. Further, water vapor and ozone in the air is absorbed by the dielectric body 30. These materials are converted to OH both in the gas phase and on the dielectric fill. As the air passes through outer filters 40 and 42, residual biological material and chemicals are removed from the air. Both are destroyed by the wash of residual UV2 and by OH that is entrained in the air.

Figure 3A:
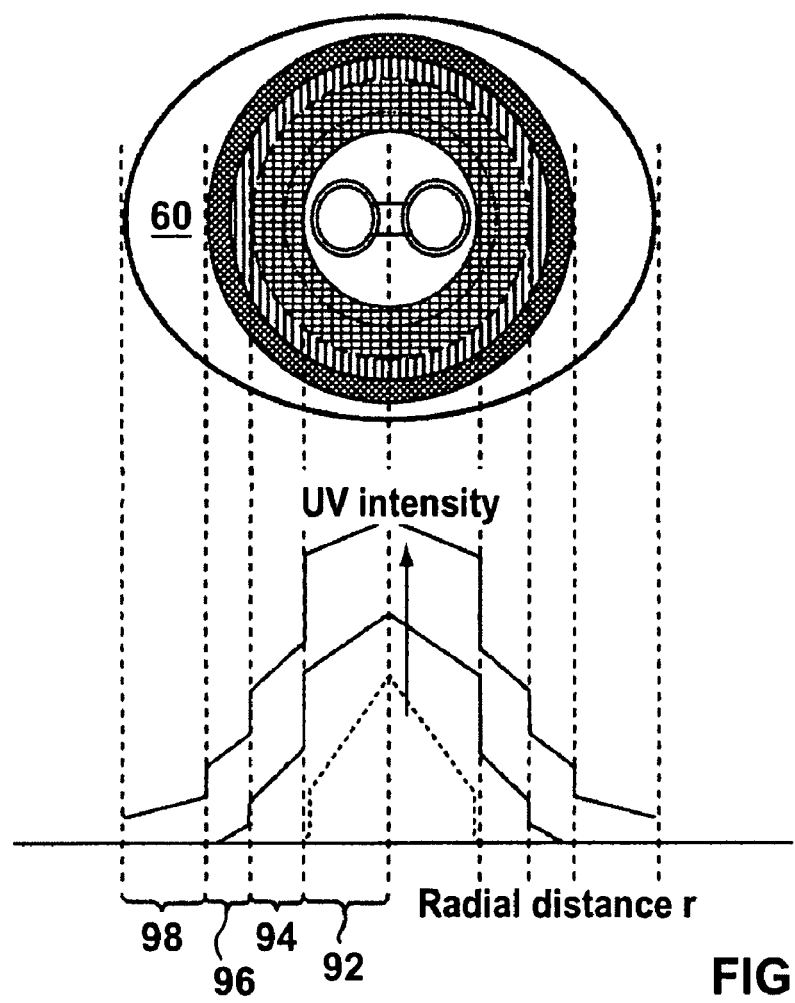
FIG. 3a is a graph of UV intensity versus radial distance.

With lamp 50 activated, FIG. 3a graphically illustrates the intensity of UV1, UV2 and UV3 radiation as a function of radial distance in the lamp cross-section illustrated in FIG. 3. Turning to these figures, it will be seen inner cavity 34 of UV chamber 60 is flooded with UV1, UV2 and UV3 light (section 92) and the dielectric body 30 is flooded with (predominately) UV2 and UV3 light (section 94). A small amount of UV2 light passes through screen mesh sleeve 38 and into filters 40 and 42 (section 96). The UV reflective coatings of walls 24 and 32 as well as of housing 12 and inner mesh 66 enhance the intensity of UV radiation in the central cavity 34. The UV reflective coating on walls 24 and 32 and on the screen mesh sleeve 38 enhance the intensity of UV radiation in the dielectric body 30. The UV absorbing coatings of intake plenum 18 and exhaust plenum 62 help ensure that any UV light reaching these extremities of the purifier are absorbed and do not leave the purifier (section 98).

The UV radiation produced by lamp 50 produces the following chemical reactions.

$$O_2 + UV1 \rightarrow O + O \quad (1)$$

$$O_2 + O \rightarrow O_3 \quad (2)$$

$$O_3 + UV1 \text{ or } UV2 \rightarrow O^* + O_2 \quad (3)$$

$$O^* + H_2O \rightarrow 2OH \quad (4)$$

$$O^* + O_2 \rightarrow O_3 \quad (5)$$

$$H_2O + UV1 \rightarrow OH + H \quad (6)$$

$$O + O_2 \rightarrow O_3 \quad (7)$$

As will be appreciated by those skilled in the art, these reactions have been simplified. In fact, other free radicals (such as H and $HO_2$) and compounds (such as $H_2O_2$) will play roles.

UV1 radiation produced by lamp 50 photo-dissociates oxygen ($O_2$) in the air resulting in the formation of ground state atomic oxygen (reaction (1)). This atomic oxygen is highly chemically reactive. A large portion of this atomic oxygen reacts with $O_2$ to form ozone ($O_3$: reaction (2)). Ozone may be further photo-dissociated by UV1 or UV2 to form excited atomic oxygen ($O^*$: reaction (3)). As will be appreciated by those skilled in the art, the optimum UV wavelength for dissociating ozone is about 250 nm. This excited atomic oxygen is even more chemically reactive than the oxygen formed in reaction (1) and rapidly attacks any water vapor present to form OH by reaction (4). The excited atomic oxygen can also be deactivated by oxygen ($O_2$) and nitrogen ($N_2$) in the air to form ground state atomic oxygen which then reacts with $O_2$ to reform ozone (reactions (5), (6) and (7)).

Atomic oxygen, ozone ($O_3$) and hydroxyl radicals (OH) will react with organic compounds and break them into oxidized fragments. However, OH removes most organic compounds at rates up to ten orders of magnitude faster than ozone. Further, ozone is a toxic gas. OH, on the other hand, is not a hazard because it is so chemically reactive that is cannot survive more than a few second in normal air. Thus, unlike ozone, it cannot accumulate.

In view of the forgoing it is desirable to create as much OH and a little ozone as possible. This means enhancing reactions (3) and (4) relative to reactions (5) to (7). This is achieved by dielectric body 30 which traps ozone, thereby increasing the rate of its photo-dissociation by reaction (3), and which traps water vapor and ozone for use in reaction (4).

A highly porous dielectric body can absorb water or ozone to up to about 30% of its weight. The high absorbency and higher density of the dielectric body 30 relative to air results in an enhancement of the volume density of water and ozone of about three orders of magnitude. The dielectric body will absorb water vapor even when relative humidity is low making it unnecessary to add water vapor to the system.

Because UV1 is primarily or entirely contained within inner cavity 34 of UV chamber 60, it will be apparent that atomic oxygen is primarily formed in the inner cavity (reaction 1). Ozone will therefore be formed (by reaction 2) in the inner cavity and in the dielectric body. Because the body 30 is primarily radiated with UV2, little ground level atomic oxygen (O)—which generates ozone—will be formed in the body. Instead, the UV2 irradiating the body will primarily photo-dissociate the ozone trapped by the body resulting in excited atomic oxygen (reaction (3)). Given the high concentration of water vapor in the body 30 and the presence of excited atomic oxygen there, OH (by reaction (4)) is formed primarily in the dielectric body.

If a suitable dielectric material is added to the inner cavity 34, or if a porous UV1, UV2 and UV3 transmitting dielectric is coated onto the lamp walls, the production of OH by reaction (6) will increase relative to reactions (1) and (2). This enhancement results from the high absorption of $H_2O$ relative to $O_2$ onto the surfaces of many dielectrics (e.g. silica gel or aluminum oxide). This effect can be useful in embodiments in which it is desirable to further minimize ozone production.

Figure 4:
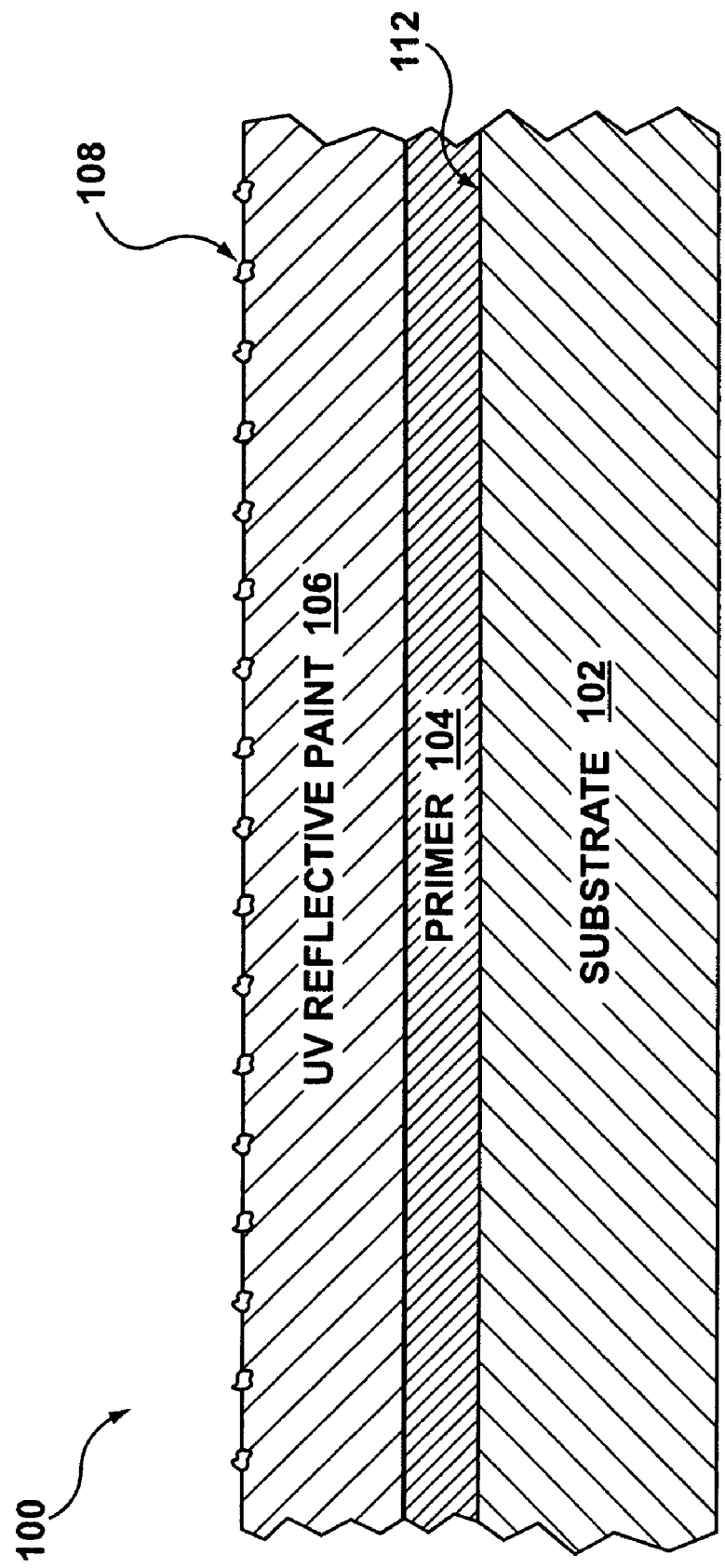
FIG. 4 illustrates a cross-section of a self-cleaning UV reflective coating exemplary of an embodiment of the present invention.
Figure 5:
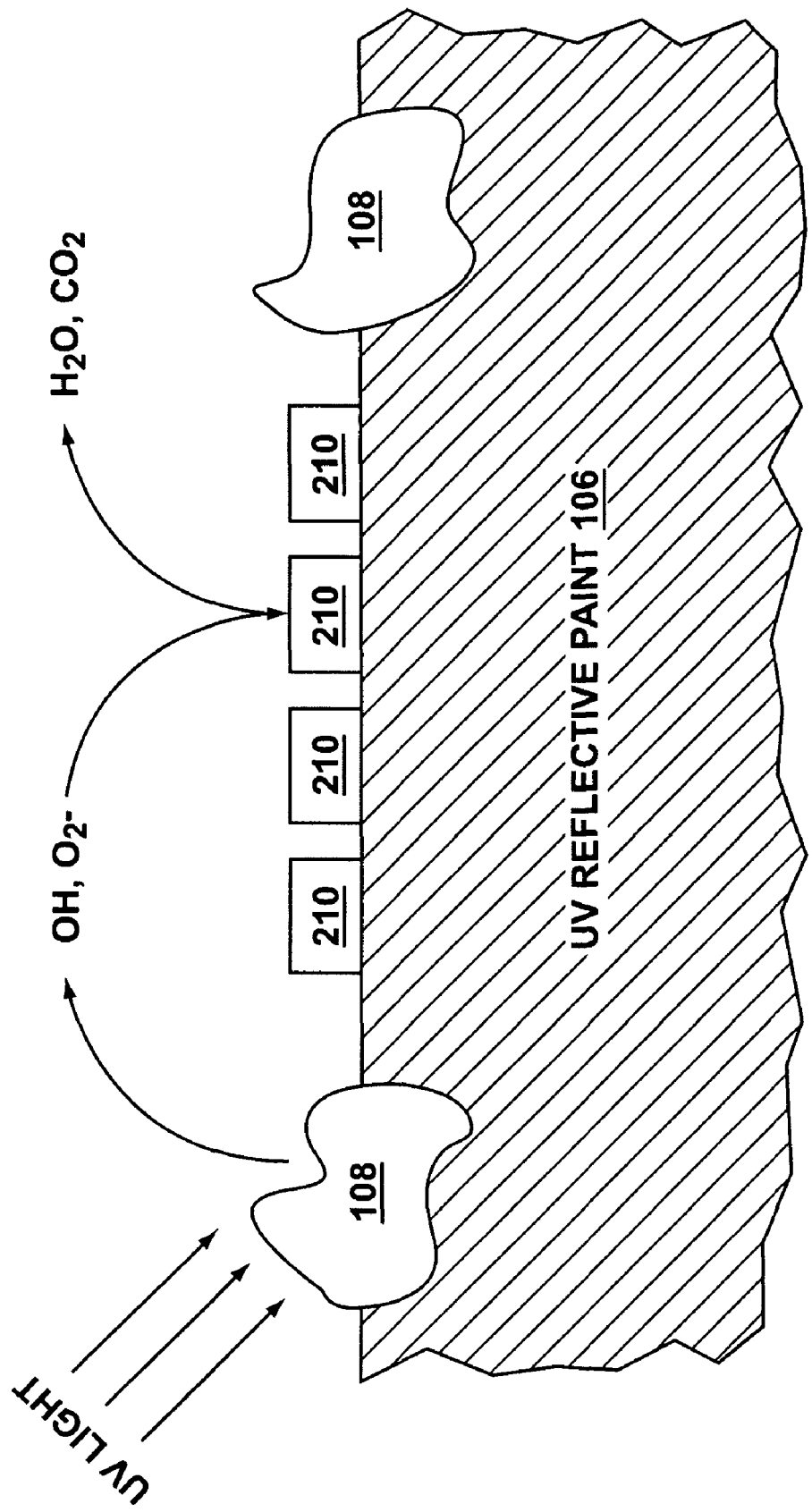
FIG. 5 illustrates a cross section of a small portion of the coating of FIG. 4 to demonstrate the self-cleaning operation of an embodiment of the present invention.

For example, by applying a pure silica gel coating 90 (FIG. 1) which is a few millimeters thick to the light emitting tube 46 of the lamp 50 of FIG. 1 or 4, the $H_2O$ present in the coating will absorb all the UV1, converting the $H_2O$ directly to OH. This will reduce the ozone production but will not block UV2 and UV3 radiation from the lamp.

As noted, the OH and atomic oxygen will fragment (oxidize) organic compounds thus destroying bacteria and viruses in the air. This will also result in fragmentation of other volatile organic compounds and organic pollutants which may be in the air, thereby reducing their concentration.

Organic compounds may stick to the dielectric body 30. However, OH will rapidly attack these surface contaminants thereby fragmenting these materials. If the fragmented materials continue to stick, they continue to be fragmented until, in many cases, water vapor and carbon dioxide results. Carbon dioxide ($CO_2$) is not absorbed by zeolite or charcoal. Thus, where the outer chemically absorbent filter 42 is fabricated of such materials, $CO_2$ will float away and out of the purifier. Since the concentrations of volatile organic compounds are small (less than a part per million) compared to the ambient concentration of $CO_2$ (about 300 parts per million), any increase in $CO_2$ caused by the oxidation of volatile organic compounds by the purifier is negligible compared to other sources and will pose no health risk.

The UV light itself will also act to sterilize biological materials in the intake air. This is particularly so in respect of material trapped by the electric field in the body 30 or trapped in outer filter 42 in view of the increased time during which such biological materials is exposed to the UV light.

Ozone reaching the outer filter 42 is readily absorbed. While it is absorbed on the filter it will be broken down by the (small) amount of UV (UV2) radiation reaching outer filter 42 and will form OH. This reaction can be facilitated by adding a catalytic mesh (with a material such as $TiO_2$) to these filters.

Screen mesh 38 could be replaced with a porous wall formed of fused UV reflecting grains having a diameter approximating that of the UV2 radiation. These UV reflecting grains could, for example, be spheres of aluminum, high purity silica, or grains of barium sulfate. It might also be fabricated out of aerogel matrices with the desired average pore sizes.

While lamp 50 is described as emitting UV1, UV2 and UV3 radiation, air will still be purified by the purifier 10 (albeit not as efficiently or completely) if the lamp emitted solely UV1 or UV2 radiation. Further, two or three lamps could be provided, one which emits UV1 radiation into the airflow path upstream of the dielectric body, a second one which emits UV2 light into the dielectric body itself and a third one which emits UV3 radiation for use in the outer filters and outer wall.

The UV reflective coatings of housing 12, walls 24 and 32, and inner mesh 66 enhance the intensity of UV radiation in the central cavity 34 due to multiple reflections of emitted photons. For the same reason, the UV reflective coating on walls 24 and 32 and screen mesh sleeve 38 enhances the intensity of UV radiation in the dielectric body 30. These multi-pass systems take advantage of the gain equation: $G=1/(1-R)$ where G is the optical gain of the cavity and R is the average reflectance of the cavity.

Over time, organic deposits will build up on the UV coatings and will reduce UV reflectance and hence reduce gain. Indeed, if reflection drops, for example, from 0.999 to 0.990 (i.e., a mere 1% drop in reflectance), gain drops from 1000 to 100, which is a 90% drop. Therefore, even a slight fouling of the UV reflective surfaces will dramatically reduce gain and hence impair the efficiency of the air purifier. To mitigate this problem, the UV reflective coatings may be made self-cleaning.

A cross-section of a self-cleaning UV reflective coating 100 exemplary of the present invention is illustrated in FIG. 4. A surface 112 of a substrate layer 102 (which layer may be any of housing 12, walls 24 and 32, annular mesh screens 38 and 66 and screen mesh sections 26 and 44) is coated with a primer layer 104, which layer is then coated with a UV reflective paint layer 106. The UV reflective paint layer 106 has embedded in its upper surface nano-particles of a photocatalytic semiconductor material, an exemplary nano-particle of which is indicated at 108.

In overview, nano-particles 108 are dispersed over the surface of the UV reflective paint layer 106. These nano-particles 108 are composed of a photo-catalytic semiconductor material that leads to the production of oxygen and hydroxyl free radicals when illuminated with UV light in the presence of water vapor. Some of these free radicals oxidize surface films, converting the surface films into gaseous $H_2O$ and $CO_2$. This reduces the amount of the organic deposits on the surface of the reflective paint layer 106. For minimum catalytic activity, the semiconductor material is ideally highly UV absorbing, however, this necessitates a method of application that minimizes the impact on the reflectance of the UV reflective coating.

It has long been accepted that UV reflective paint may be made through the use of barium sulfate crystals. See, for instance, U.S. Pat. No. 3,957,675, issued May 18, 1976 to Schutt, hereby incorporated herein by reference, for a discussion of appropriate choices for a binder. Further, consider U.S. Pat. No. 5,246,687, issued Sep. 21, 1993 to Gorre, also hereby incorporated herein by reference, for a preparation of barium sulfate that provides a high purity, which is of particular interest when preparing a UV reflective coating.

It is also known to use a photo-catalytic semiconductor material, such as $TiO_2$, to coat surfaces so that the coated surfaces may be self-cleaning. For a full discussion of the self-cleaning properties afforded a surface through the application of $TiO_2$, see Dr. Akira Fujishima, et al., "$TiO_2$ Photocatalysis Fundamentals and Applications", BKC, Inc., May 1999. Briefly, the excitation of $TiO_2$ by UV radiation in the presence of water vapor leads to the production of OH and $O_2^-$ free radicals according to the following reactions:

$$\text{UV (@ 254 nm)} + TiO_2 \overset{H_2O}{\Rightarrow} OH + O_2^-.$$

The free radicals then interact with any organic deposits on the coated surface. Where the organic deposits are represented by the character "R", the following reactions describe the combination of these free radicals and organic deposits:

$$n\,OH + R \Rightarrow x\,H_2O + y\,CO_2$$

$$n\,O_2^- + R \Rightarrow x\,H_2O + y\,CO_2.$$

When considering a $TiO_2$ coating on a layer of UV reflective paint, attention must be paid to the properties of $TiO_2$. In particular, $TiO_2$ is absorptive of UV. Thus, while historically $TiO_2$ has proven useful as a self-cleaning coating for ceramic tile, glass and mirrors among other substances, its usefulness in relation to UV reflective coatings was not apparent.

Returning to FIG. 4, the reflective paint layer 106 includes particles of a scattering material and a binding material. An exemplary composition consists of about 85 percent-by-weight barium sulfate 300 nm crystals and about 15 percent-by-weight of a 40 percent colloidal silica solution. These materials may be combined in a ball mill for 30 minutes of grinding. The components of the reflective paint layer 106 are chosen so that the reflective paint layer 106 is not reactive with the free radicals formed through the photo-catalytic action of the nano-particles 108. The scattering material used for the reflective paint layer 106 is selected for maximum scattering of incident optical energy. In choosing a suitable size for the particles (e.g., the 300 nm crystals), consideration must be given to a desired refractive index and the shape of the particles of scattering material. In general, the size for the particles will range from 20% to 200% of the wavelength of the light to be reflected. The binding material, colloidal silica in the above case, for the reflective paint layer 106 is selected for minimum absorbance at the wavelength to be reflected.

The reflective paint layer 106 may be applied to a substrate 102 of aluminum, galvanized steel or plastic (polyethylene) as follows:

If the substrate 102 is aluminum, the surface 112 may be pre-cleaned with a phosphoric acid based cleaner, such as ALUMIPREP® 33 marketed by U.S. Paint Corporation of St. Louis, Mo., then rinsed with distilled water. The cleaning action may comprise spraying the substrate 102 with the cleaner, washing the substrate 102 with the cleaner or dipping the substrate 102 in the cleaner. Abrasion, for additional cleaning, is optional. Alternatively, the surface 112 can be pre-cleaned with a $CO_2$ liquid spray. If the substrate 102 is galvanized steel, the surface 112 may be degreased with an organic solvent, such as acetone, or liquid $CO_2$. If the substrate 102 is plastic, the surface 112 may be pre-cleaned (i.e., sprayed, dipped) with isoproponal, then dried. Additionally, ultrasonic cleaning methods and agitation may be part of the above cleaning processes.

After preparation of the substrate surface, and before the application of the reflective paint layer 106, a primer layer 104 may be applied. The primer layer 104, though not entirely necessary, improves the adhesion of the reflective paint layer 106 to the substrate 102 and protects the substrate 102 from direct oxidization by free radicals. The primer layer 104 may be provided as a 40 percent-by-weight solution of 25 nm colloidal silica solution, spread over the surface 112 in a thin layer preferably 25 to 100 nm thick. This primer layer 104 provides a protective silica film over the underlying surface 112 which protects the surface 112 from direct oxidization by free radicals. If the substrate 102 is plastic, the surface 112 may be coated with a mixture of 25 nm silica solution combined with aluminum powder (10 percent-by-weight) to provide a UV-opaque coating.

After the surface 112 has been primed as above, the surface 112 is immediately coated with the reflective paint layer 106. The reflective paint layer 106 is coated on the primer layer 104 by dipping, spraying or brushing to a layer thickness of 100 to 400 μm.

Before the reflective paint layer 106 is allowed to dry, the reflective paint layer 106 is over coated with the photo-catalytic material as follows:

A solution of about one percent-by-weight of $TiO_2$ nano-particles is combined with water with or without a suspension agent such as colloidal silica. This solution is aerosolized in a collision nebulizer so that nano-particles of $TiO_2$ are formed at the nozzle of the nebulizer. These nano-particles are sprayed over the surface of the wet reflective paint layer 106. The spray rate is controlled so that the area coverage of the $TiO_2$ over the reflective paint layer 106 is less than about one percent.

Preferably, the nano-particles 108 have a size that is less than one tenth of the UV wavelength to be reflected. For example, where the UV wavelength to be reflected is centered at 254 nm, a nano-particle size of about 25 nm is appropriate, for instance, Titandioxid P 25 from Degussa of Dusseldorf, Germany. This size makes the nano-particles 108 nearly invisible to the UV light. Smaller particles have a further advantage of being closer together than larger particles for the same percentage of surface coverage. This proximity benefits the self-cleaning process in that, in general, the distance the free radicals are required to travel is reduced. The self-cleaning action of the nano-particles 108 may be increased through the use of larger particles or a higher percentage coverage, however, these increases come at the cost of increased UV absorption. In practical terms, the size of particle is limited to a range of 0.5 nm to 1000 nm while the percentage of coverage may range between 0.01% and 5.0%.

After coating with the nano-particles, the coating 100 is air dried at about 50° C. for 30 minutes, then baked at a temperature in the range from about 50° C. to about 350° C. for one hour or longer.

The operation of the coating is illustrated in FIG. 5. UV light strikes the photo-catalytic nano-particles 108, in the presence of water vapor, and OH and $O_2^-$ free radicals are created. These free radicals migrate to the surface of the reflective paint layer 106 by normal kinetic processes. Some of these free radicals oxidize surface films (often polymer chains of R groups, here indicated at 210), thereby converting the polymer chains 210 into gaseous $H_2O$ and $CO_2$, which drift away. This process tends to remove organic deposits from the surface of the reflective paint layer 106.

Since non-soluble materials are used for the preparation of the layers (104, 106), the coating 100 can be made water resistant. This makes the coating 100 suitable for high humidity applications.

In review, nano-particles 108 may be dispersed over the reflector so that they cover a small fraction of the reflector surface. The small amount of UV absorbed by the nano-particles 108 results in a photo catalytic process forming free radicals such as OH and $O_2^-$. Normal kinetic processes detach the free radicals formed on the surface of the nano-particles 108 and carry the free radicals over the adjacent surface of the reflective paint layer 106. These free radicals oxidize organic compounds on the surface of the reflective paint layer 106 converting the free radicals into gaseous $H_2O$ and $CO_2$ that float away, rendering the surfaces clean and highly reflective.

As will be apparent to a person skilled in the art, other scattering materials, e.g., aluminum oxide, may be used in making the reflective paint layer 106.

Furthermore, embodiments of the present invention may be realized without the reflective paint layer 106. With an appropriate form of adhesion, such as a thin, UV transparent glue, a coat of the nano-particles 108 may be applied directly to a UV reflective surface, such as aluminum. Such a form of adhesion would necessarily allow the surface to remain suitably UV reflective while not significantly hindering the reactions catalyzed by the nano-particles 108.

Figure 6:
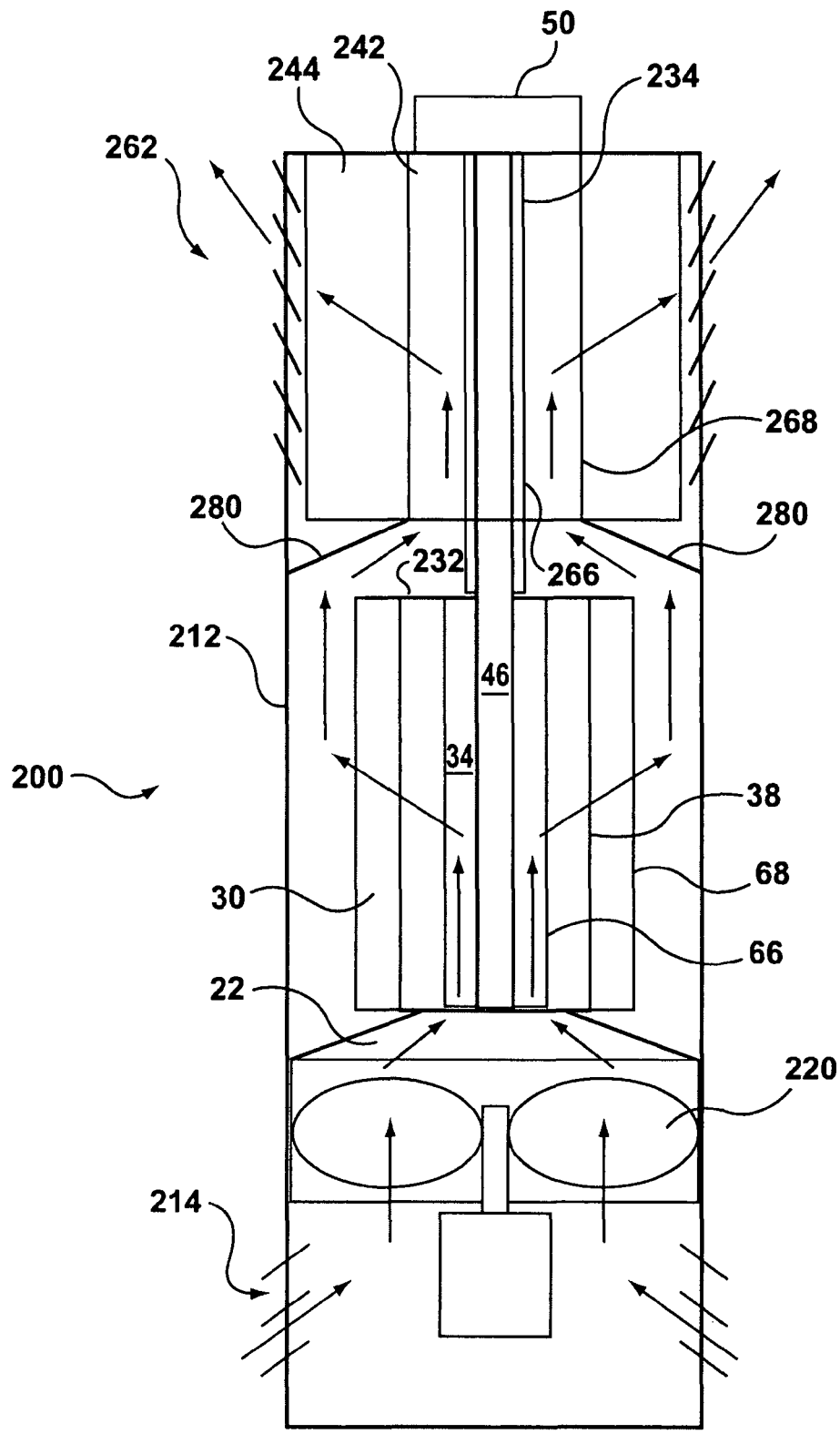
FIG. 6 is a schematic side view of an air purifier made in accordance with another embodiment of this invention.

FIG. 6 illustrates an air purifier 200 in accordance with another embodiment of this invention. Turning to FIG. 6, wherein like parts have like reference numerals, housing 212 of purifier 200 is tubular. Air inlets 214 in one end of the housing feed to blower 220. An outlet plenum 22 extends between the exhaust of the blower and the central cavity formed by the annular dielectric body 30. An annular plate wall 232 abuts the end of the dielectric body 30 remote from plenum 22. Baffles 280 extend between housing 212 and an end of annular particulate filter 242. A chemically absorbent outer filter 244 extends between particulate filter 242 and air exhaust 262. Lamp 50 extends through the annulus formed by the particulate filter 242 and the annulus formed by dielectric body 30. As well as the inner and outer annular wire mesh 66, 68 associated with the dielectric body, there is an inner and outer wire mesh 266, 268 associated with the filters 242, 244. Like meshes 66, 68, meshes 266, 268 are polarised with a voltage source (not shown). With purifier 200, when blower 220 is activated, air flows out from the blower into dielectric body 30, then out from the body to between body 30 and the wall of housing 212. Air then passes into particulate filter 40, then through outer filter 42 and out exhaust 262. Unlike purifier 10 (FIG. 1), there are no filters surrounding dielectric body 30. Instead, filters 242, 244, while concentric with lamp 50, are separate from the body 30. With this arrangement, UV light falls directly on the particulate and chemical filters. Appropriate screen meshes could be added to enhance UV2 in the cavity 234 inside the two filters 242, 244. In addition, photoelectric effect mesh electrodes 266, 268, if added to filters 40 and 42, enhance their effectiveness. Instead of a mesh electrode, one method of producing a cathode might entail a coating of cesium iodide or similar material on an inner face of one of the filters. This coating would absorb wavelengths shorter than 185 NM and produce photo-electrons at such wavelengths. It would also be transparent at wavelengths longer than 200 NM. Thus, the cathode would inhibit the emission of UV1 past filters 242, 244 by blocking the ozone producing UV but still allow UV2 and UV3 to be emitted which would sterilize the filters 242, 244 and aid photochemical processes.

A basic purifier in accordance with this invention would comprise a source of UV which irradiates a suitable dielectric body interposed in the airflow path of the purifier. The effectiveness of the purifier is enhanced by the addition of a cathode and anode to attract and trap charged particles for UV irradiation. Further improvement in efficiency is obtained with the addition of the each of the other features described, such as the described filters and coatings.

Other modifications will be apparent to those skilled in the art and, therefore, the ambit of the invention is set out in the claims herefollowing.

What is claimed is:

1. An air purifier comprising:
   an air flow cavity bounded by cavity walls;
   a source of ultraviolet light for emitting ultraviolet light such that ultraviolet light is present within said cavity;
   an ultraviolet light reflective coating on a surface area of said cavity walls and a plurality of photocatalytic particles on said surface area of said cavity walls;
   said coating completely covering said surface area, said photocatalytic particles covering no more than 5.0% of said surface area so as to not materially affect UV reflectance of said coating;
   said photocatalytic particles being of a type which leads to production of oxygen and hydroxyl free radicals when illuminated with ultraviolet light in the presence of water;
   a dielectric body which is porous to air and transmissive to ultraviolet light interposed across an air flow path within said cavity; and
   an anode and cathode in said dielectric body.

2. The air purifier of claim 1 wherein said photocatalytic particles are made of a semiconductor material.

3. The air purifier of claim 2 wherein said semiconductor material is $TiO_2$.

4. The air purifier of claim 1 wherein said photocatalytic particles are on said reflective coating.

5. The air purifier of claim 1 wherein said photocatalytic particles are partially embedded in said reflective coating.

6. The air purifier of claim 5 wherein said photocatalytic particles cover about 1% of said surface area.

7. The air purifier of claim 5 wherein said photocatalytic particles are nano-particles.

8. The air purifier of claim 1 wherein said photocatalytic particles cover about 1% of said surface area.

9. The air purifier of claim 1 wherein said source of ultraviolet light emits ultraviolet light at a first wavelength in a range of 185 to 300 nm.

10. The air purifier of claim 9 wherein said first wavelength is about 254 nm.

11. The air purifier of claim 9 wherein said photocatalytic particles are of a size of about twenty-five nm.

12. The air purifier of claim 9 wherein said source of ultraviolet light is a lamp extending within said cavity.

13. The air purifier of claim 1 wherein said source of ultraviolet light is arranged to emit ultraviolet light such that ultraviolet light at least at a second wavelength being approximately below 185 nm is present upstream of said dielectric body and ultraviolet light at said first wavelength is present in said dielectric body.

14. The air purifier of claim 13 wherein said dielectric body more strongly absorbs ultraviolet light at said second wavelength than light at said first wavelength such that light at said first wavelength is present in said dielectric body at a higher intensity than any light at said second wavelength present in said dielectric body.

15. The air purifier of claim 14 wherein said dielectric body comprises silica.

16. The air purifier of claim 14 wherein said dielectric body comprises quartz fibres.

17. The air purifier of claim 16 wherein said quartz fibres are coated with a silica coating.

18. The air purifier of claim 14 wherein said dielectric material comprises alumina fibres.

19. The air purifier of claim 1 wherein said cathode has a cathode coating which is highly reflective of ultraviolet light, said cathode coating having a plurality of $TiO_2$ particles thereon.

20. The air purifier of claim 1 wherein said cathode coating comprises rhodium coated aluminum.

21. The air purifier of claim 1 further comprising a mesh surrounding said dielectric body having a mesh size at least an order of magnitude less than a longest wavelength of said first wavelength.

22. The air purifier of claim 21 wherein said dielectric body is annular and said source of ultraviolet light emits within an annular cavity of said dielectric body.

23. The air purifier of claim 22 wherein said annular cavity is sized so that a preponderance of ultraviolet light at said second wavelength is absorbed in said central cavity.

24. The air purifier of claim 21 wherein said source of ultraviolet light emits light at a stand-off from said dielectric.

25. The air purifier of claim 1 wherein said reflective coating is a reflective paint having a thickness of 100 to 400 µm.

26. The air purifier of claim 25 wherein said reflective paint comprises barium sulfate crystals and a colloidal silica solution.

27. The air purifier of claim 26 wherein said reflective paint comprises about 85 percent-by-weight barium sulfate 300 nm crystals and about 15 percent-by-weight of 40 percent colloidal silica solution.

28. The air purifier of claim 27 further comprising a primer layer between said reflective paint and said walls, said layer protecting said walls from direct oxidization by free radicals.

29. The air purifier of claim 28 where said substrate is aluminum and said primer layer is a 40 percent-by-weight solution of 25 nm colloidal silica solution.

30. The air purifier of claim 25 wherein said primer layer has a thickness of 25 to 100 nm.

31. An air purifier comprising:
an air flow cavity bounded by cavity walls;
a source of ultraviolet light for emitting ultraviolet light such that ultraviolet light is present within said cavity;
an ultraviolet light reflective coating on said cavity walls;
a plurality of photocatalytic particles associated with said reflective coating, said photocatalytic particles of a type which leads to production of oxygen and hydroxyl free radicals when illuminated with ultraviolet light in the presence of water, wherein said photocatalytic particles cover 0.01% to 5.0% of a surface area of said reflective coating so as to not materially affect UV reflectance;
a dielectric body which is porous to air and transmissive to ultraviolet light interposed across an air flow path within said cavity; and
an anode and cathode in said dielectric body.

32. The air purifier of claim 31 wherein said photocatalytic particles are made of a semiconductor material.

33. The air purifier of claim 32 wherein said semiconductor material is $TiO_2$.

34. The air purifier of claim 31 wherein said photocatalytic particles are on said reflective coating.

35. The air purifier of claim 31 wherein said photocatalytic particles are partially embedded in said reflective coating.

36. The air purifier of claim 35 wherein said photocatalytic particles are nano-particles.

37. The air purifier of claim 31 wherein said source of ultraviolet light emits ultraviolet light at a first wavelength in a range of 185 to 300 nm.

38. The air purifier of claim 37 wherein said first wavelength is about 254 nm.

\* \* \* \* \*